United States Patent Office 2,973,379
Patented Feb. 28, 1961

2,973,379

OMEGA-ALKYLMERCURYTHIO FATTY ACIDS, DERIVATIVES THEREOF AND PROCESS OF PREPARING THE SAME

Kanjiro Kabayashi, Nishinomiya City, and Hideo Suzuki, Akashi City, Japan, assignors to Fujisawa Pharmaceutical Co., Ltd., Osaka, Japan No Drawing. Filed Jan. 19, 1959, Ser. No. 787,390

14 Claims. (Cl. 260—399)

This invention relates to new and useful omega-alkylmercurythio fatty acids, derivatives thereof such as ester, amide and metal salt and to a process of preparing the same.

The new compounds of the present invention may be illustrated by the following general formula:

$$RHgS(CH_2)_nR'$$

in which R is a lower alkyl radical, $n$ is a whole number from 4 to 12 and R' is selected from the group consisting of carboxylic acid (—COOH) and esters, amides and metal salts thereof.

The compounds of the present invention are prepared by reacting omega-mercapto fatty acids having the general formula:

$$HS(CH_2)_nR'$$

in which $n$ and R' are the same as before, with alkylmercury compounds having the general formula:

$$RHgX$$

in which R is the same as before, X is selected from the group consisting of halogen atom, hydroxyl radical and residues of inorganic acids and residues of lower fatty acids.

The raw materials of this invention, omega-mercapto fatty acids, are prepared by hydrolyzing omega-acetylthio fatty acids, which are obtained by reacting fatty acids having a double bond at omega-position with thioacetic acid. This process of obtaining omega-mercapto fatty acids by hydrolysis of omega-acetylthio fatty acids was found initially by the inventors of this invention. In general, the preparing of omega-mercapto fatty acids is difficult. In general method, it is considered that omega-mercapto fatty acids are prepared by reduction of the product obtained by reacting omega-halogeno fatty acids with alkalidisulfide or by hydrolyzing the product obtained by reacting the same with thiourea. However, it is not easy to prepare the omega-halogeno fatty acids; namely, a mixture of isomers of halogenated fatty acids is obtained when fatty acids having a double bond at omega-position are reacted with hydrohalogenic acids, and so the pure substance is unobtainable. We have performed the above mentioned process by which are produced omega-mercapto fatty acids only, without being obtained unnecessary isomers, in good yield and easily. This process is carried out by reacting one mole of fatty acids having a double bond at omega-position, for instance undecylenic acid, with a slight excess of one mole of thioacetic acid. When the purity of raw material is low, the yield tends to decrease greatly, and so it is desirable to use a purified material as far as possible. The hydrolysis of omega-acetylthio fatty acids is carried out easily by using alkaline solution, as in the case with hydrolysis of esters.

Derivatives of omega-mercapto fatty acids such as esters, amides and salts thereof may be used in this invention as a raw material as well as the free acid. As the other raw materials of this invention are employed alkylmercury compounds such as alkylmercury hydroxide, -chloride, -bromide, -phosphate, -sulfate, -acetate and -propionate.

Alkylmercury compounds are reacted with equal mole of omega-mercapto fatty acids by mixing the two compounds. In this reaction, as the solvent it is desirable to use water, aliphatic lower alcohols, aliphatic lower ketones or the mixture of them though the solvent is not limited on them. Also, as alkylmercury compounds it is desirable to use alkylmercury hydroxide or alkylmercury acetate for obtaining the object compounds in good yield. Since, however, alkylmercury hydroxide is unstable and alkylmercury acetate is difficult to prepare, it is preferred to use alkylmercury halide, alkylmercury phosphate and alkylmercury sulfate etc. in the presence of an equal mole of alkali acetate or alkali hydroxide, which contains alkylmercury acetate or -hydroxide respectively in condition of the solution. This reaction may be easily carried out without heating. In case the reaction is carried out with a relatively little amount of the solvent, it is desirable to mix each solution of raw materials with heating.

The final products of this invention, for example omega-alkylmercurythio undecanoic acid and alkylester thereof, have a strong antibacterial and germicidal action and have a characteristic of affinity with fat and lipoid. Metal salts, amides and esters of the acids are also available in accordance with the object of using as active ingredients for antibacterial and germicidal remedies.

Examples are shown as follows.

EXAMPLE 1.—OMEGA-ETHYLMERCURY-THIOUNDECANOIC ACID (a) *omega-Acetylthioundecanoic acid*

Thioacetic acid 2.5 g. was dropped with stirring into undecylenic acid 5.0 g. melted by warming. The reaction mixture produced an exothermic reaction after a few minutes. After being allowed to stand for a while, the reaction mixture was heated on a water bath for 2 hours. After cooling the crystal so formed was duly mixed with petroleum ether, the insoluble crystal is collected on a filter, washed with a little amount of petroleum ether, and dried on air. Thus a colorless, plate-like crystal 6.0 g. with M.P. 54–58° C. was obtained. The pure omega-acetylthioundecanoic acid with M.P. 57–58.5° C. was obtained by recrystallization from petroleum ether.

(b) *omega-Mercaptoundecanoic acid*

10% sodium hydroxide 14 g. was added to omega-acetylthioundecanoic acid 3 g. and the mixture was heated under reflux for one hour. After cooling the reaction mixture was filtered and the filtrate was acidified with hydrochloric acid. The precipitated white crystals were washed, dried and purified by distillation under reduced pressure.

Omega-Mercaptoundecanoic acid is a colorless, plate-like crystal: B.P. 158.5–159° C./1 mm. Hg, M.P. 48–50° C. Ethyl ester of omega-mercaptoundecanoic acid is colorless oily liquid: B.P. 128–129° C./0.8 mm. Hg.

(c) *omega-Ethylmercurythioundecanoic acid*

The hot solution of anhydrous sodium acetate 1.5 g. and methanol 15 ml. was added to the hot solution of bisethylmercuryphosphate 5 g. and methanol 25 ml. under shaking, then the precipitated bisodium hydrogen phosphate was filtered off. To the filtrate was added the hot solution of omega-mercaptoundecanoic acid 4 g. and methanol 6 ml., then immediately a colorless, plate-like crystal was formed. After cooling the crystal was collected on a filter, washed with methanol and dried. Thus was obtained ethylmercurythioundecanoic acid 7.2 g., M.P. 86–87.5° C.

Analysis.—Calculated for $C_{13}H_{26}O_2SHg$: Hg. 44.88%. Found: Hg 44.51%.

In above reaction when using an equivalent mole of ethyl ester or n-butyl ester of omega-mercaptoundecanoic acid in place of omega-mercaptoundecanoic acid, ethyl ester of omega-ethylmercurythioundecanoic acid (a colorless, plate-like crystal; M.P. 28–29° C.) was obtained in 87%, or n-butyl ester of omega-ethylmercurythioundecanoic acid (a colorless, plate-like crystal, M.P. 19–22° C.) in 80%.

The sodium or potassium salt of omega-ethylmercurythioundecanoic acid was obtained by treating omega-ethylmercurythioundecanoic acid with an equivalent mole of sodium carbonate or potassium carbonate solution. The sodium salt is colorless crystalline powder, M.P. 250–260° C. (decomp.), the potassium salt is colorless crystalline powder, M.P. 155–165° C. (decomp.)

EXAMPLE 2.—SODIUM OMEGA-n-BUTYL-MERCURYTHIOUNDECANOATE

To the solution of sodium hydroxide 1 g. and methanol 80 ml. was added n-butylmercurychloride 6 g. with stirring, the reaction mixture so obtained was dissolved by warming. To this solution was added the solution of omega-mercaptoundecanoic acid 5 g., sodium hydroxide 1 g. and water 30 ml. After being allowed to stand for over-night, sodium omega-n-butylmercurythiundecanoate was obtained in the form of a colorless, scale-like crystal, which was then washed with a little amount of water and dried. Yield 9 g. M.P. 248–259° C. (decomp.).

When the hot aqueous solution of sodium omega-n-butylmercuryundecanoate was by adding a little excess of an equivalent mole of 10% acetic acid solution, omega-n-butylmercurythioundecanoic acid was obtained in a colorless, plate-like crystal, M.P. 73–74.5° C.

Analysis.—Calculated for $C_{15}H_{30}O_2SHg$: Hg. 42.27%. Found: Hg 42.51%.

EXAMPLE 3.—OMEGA-ETHYLMERCURY-THIOTRIDECANOIC ACID

The hot solution of 2 g. of anhydrous sodium acetate 0.65 g. and methanol 7 ml. was added to the hot solution of bisethylmercuryphosphate 2.2 g. and methanol 10 ml. After being allowed to stand for a while, the precipitated sodium hydrogen phosphate was filtered off. To the filtrate was added the solution of omega-mercaptotridecanoic acid and methanol 4 ml. under shaking, immediately omega-ethylmercurythiotridecanoic acid was obtained in the form of a colorless, scale-like crystal, which was then washed with methanol and dried. Yield 3.4 g., M.P. 90–92.5° C.

Analysis.—Calculated for $C_{15}H_{30}O_2SHg$: Hg. 42.29%. Found: Hg 41.98%.

EXAMPLE 4.—OMEGA-ETHYLMERCURYTHIO-n-VALERIC ACID

The solution of omgea-mercapto-n-valeric acid 2.5 g., potassium hydroxide 1 g. and water 100 ml. added to the clear solution obtained by filtration after warming the solution of bisethylmercuryphosphate 5 g., potassium hydroxide 1 g. and water 25 ml. The reaction mixture was acidified with 10% acetic acid solution and the precipitated colorless crystal was collected on a filter. The crystal was added in hot water 50 ml. and heated for about 10 minutes on a water bath with stirring, and then coooled. Insoluble solid matter was extracted with benzene, and the benzene layer was dried with anhydrous sodium sulphate. Thus omega-ethylmercurythio-n-valeric acid, a colorless crystal with M.P. 56–58° C., could be obtained by evaporating benzene under reduced pressure. The pure colorless, plate-like crystal was obtained by recrystallization from benzene-petroleumeter mixture.

Analysis.—Calculated for $C_7H_{15}O_2SHg$: Hg 55.30%. Found: Hg 55.68%.

EXAMPLE 5.—OMEGA-ETHYLMERCURY-THIOCAPRONIC ACID

The mixture of omega-mercaptocapronic acid 2.5 g., potassium hydroxide 1 g. and water 5 ml. was added with shaking to the clear solution obtained by filtration after warming the solution of bisethylmercuryphosphate 4.6 g., potassium hydroxide 1 g. and water 10 ml.

The reaction mixture was acidified with 4 ml. of 10% acetic acid solution, and a colorless crystal was collected on a filter. The crystal was mixed with 30 ml. of hot water and warmed for about 10 minutes on a water bath with stirring. After cooling the insoluble solid matter was extracted with benzene and the benzene layer was dried with anhydrous sodium sulphate and then the solvent was distilled off in vacuo. Ethylmercurythiocapronic acid 5.3 g., M.P. 52–57° C. was obtained. A colorless, plate-like crystal, M.P. 57–59° C., was obtained by recrystallization from the mixture of benzene and petroleum ether.

Analysis.—Calculated for $C_8H_{16}O_2SHg$: Hg 53.23% Found: Hg 52.98%.

We claim:
1. Compounds having the general formula

$$RHgS(CH_2)_nR'$$

in which R is a lower alkyl radical, n is a whole number from 4 to 12, R' is selected from the group consisting of the carboxyl acid group (COOH) and the group COOY, wherein Y is a member selected from the group consisting of an alkali metal and a lower alkyl radical.
2. omega-Ethylmercurythioundecanoic acid.
3. Lower alkyl esters of omega-ethylmercurythioundecanoic acid.
4. Ethylester of omega-earylmercurythioundecanoic acid.
5. Butylester of omega-ethlymercurythioundecanoic acid.
6. omega-Butylmercurythioundecanoic acid.
7. Lower alkyl esters of omega-Butylmercurythioundecanoic acid.
8. omega-Ethylmercurythiotridecanoic acid.
9. omega-Eethylmercurythio-n-valeric acid.
10. omega-Ethylmercurythiocaproic acid.
11. A process of preparing omega-ethylmercurythioundecanoic acid which comprises reacting omega-mercaptoundecanoic acid with ethylmercury compound having the general formula $$C_2H_5HgX$$

in which X is a member selected from the group consisting of a halogen atom, the hydroxyl group, and the equivalent of the phosphoric acid and the sulfuric acid radicals.
12. In a process of preparing compounds of the formula $$RHgS(CH_2)_nR'$$

wherein
R is a lower alkyl radical, n is a whole number from 4 to 12, and
R' is a member selected from the group consisting of the carboxyl group and the group COOY, wherein Y is a member selected from the group consisting of an alkali metal and a lower alkyl radical, which process comprises reacting an omega-mercapto fatty acid of the formula $$HS(CH_2)_nR'$$

wherein R' and n are the same as indicated hereinabove, with an alkyl mercury compound of the formula $$RHgX$$

wherein
X is a member selected from the group consisting of a halogen atom, the hydroxyl group, the lower alkanoyloxy group, and the equivalent of the phosphoric acid and the sulfuric acid radicals and R is the same as indicated hereinabove.

13. The alkali metal salt of omega-ethylmercurythioundecanoic acid.

14. The alkali metal salt of omega-butylmercurythioundecanoic acid.

References Cited in the file of this patent

UNITED STATES PATENTS

| | | |
|---|---|---|
| 2,568,648 | McCool | Sept. 18, 1951 |
| 2,648,650 | Weinberg et al. | Aug. 11, 1953 |

FOREIGN PATENTS

| | | |
|---|---|---|
| 732,433 | Great Britain | June 22, 1955 |